Dec. 29, 1942. J. P. JORGENSEN 2,306,389
MEANS FOR CONNECTING METALLIC AND NON-METALLIC PARTS
Filed March 21, 1941
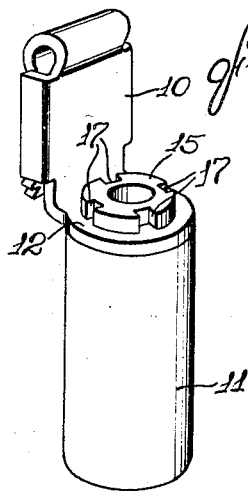
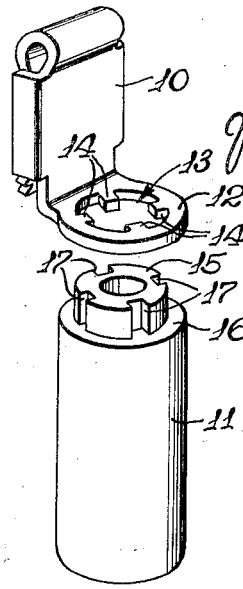
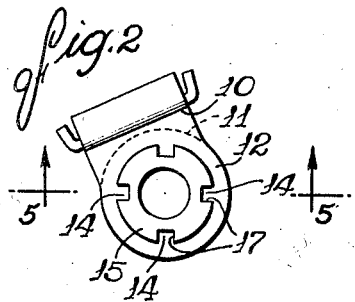
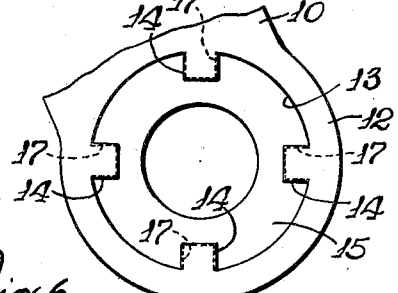
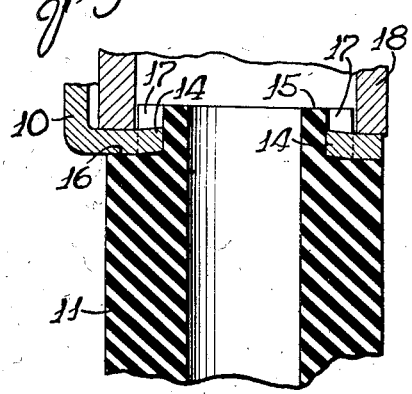
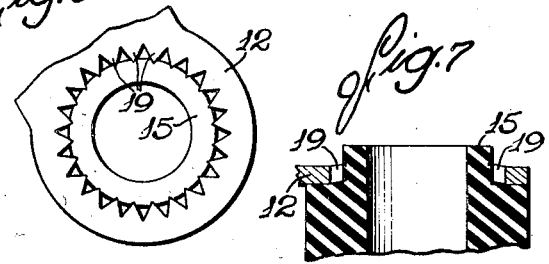
INVENTOR
James P. Jorgensen
By Parker, Carlson, Pitzner & Hubbard
ATTORNEYS Patented Dec. 29, 1942

2,306,389

UNITED STATES PATENT OFFICE 2,306,389

MEANS FOR CONNECTING METALLIC AND NONMETALLIC PARTS

James P. Jorgensen, Beloit, Wis.

Application March 21, 1941, Serial No. 384,492

3 Claims. (Cl. 287—103)

This invention relates to means for fastening a metal part to a rigid non-metallic part such, for example, as hard molded plastic material.

A general object is to provide such a fastening connection which is simple and inexpensive to construct, easy to apply, and permanently effective.

Another object is to provide a novel connection which becomes effective simply by pressing the metallic and non-metallic parts together.

A more detailed object is to provide surfaces on the two parts adapted to telescope together under pressure with one or more projections on the metallic part bent as an incident to pressing the parts together so as to bite into the non-metallic part and lock the two parts together.

The invention also resides in the novel method of forming the connection.

Other objects and advantages of the invention will become apparent from the following detailed description taken in connection with the accompanying drawing, in which Figure 1 is a perspective view of two parts fastened together in accordance with the present invention.

Fig. 2 is a plan view of the parts as shown in Fig. 1.

Fig. 3 is a perspective view of the parts disassembled but positioned for connection.

Fig. 4 is a plan view of the parts as shown in Fig. 3.

Fig. 5 is a section taken along the line 5—5 of Fig. 2 together with one of the assembling tools.

Figs. 6 and 7 are views similar to Figs. 2 and 3 showing a modification.

While the invention is susceptible of various modifications and alternative constructions and to joining of a wide variety of materials, I have shown in the drawing and will describe herein typical forms and applications of the invention. It is to be understood, however, that I do not intend to limit the invention by such disclosure but aim to cover all modifications, alternative constructions, methods and uses falling within the spirit and scope of the invention as expressed in the appended claims.

In the drawing, the metal part to be joined to the non-metallic part is a stamping 10 composed of sheet metal such as steel and constituting a bracket for supporting the non-metallic part which as shown comprises a tube 11. This may be composed of various non-metallic materials having the requisite rigidity and hardness. Herein, a hard molded plastic such as Bakelite, hard rubber, or the like is employed although paper impregnated with plastic may be used. In this instance, the connection is between one end of the insulating tube and a flange 12 on the bracket.

The improved method of fastening the parts together comprises forming complementary surfaces on the two parts adapted to interfit in telescoping relation under pressure and with one or more teeth or projections forming part of the surface of the metal part, and forcing the male part into the female part while permitting said teeth to be bent by the non-metallic part and thus positioned to bite into the latter part and hold the two together.

In the embodiment shown in Figs. 1 to 5, the flange 12 constitutes the female part, being punched out to form an aperture 13 and a plurality of inwardly projecting teeth 14 annularly spaced apart and lying in the plane of the aperture. To facilitate punching, the teeth preferably are of generally rectangular shape being somewhat narrower than the notches between the adjacent teeth.

To form a projection capable of fitting snugly into the aperture 13, one end 15 of the non-metallic part 11 is reduced to a diameter substantially equal to that of the aperture, the end having an axial length somewhat greater than the thickness of the flange 12 and terminating at a shoulder 16. At annularly spaced points corresponding to the spacing of the teeth 14, the end 15 has formed therein longitudinal grooves or notches 17 opening outwardly and shaped in cross-section to correspond to the teeth 14. At least one dimension of each groove, that is, radially or circumferentially, is made slightly smaller than the corresponding dimension of the mating tooth 14 so that considerable pressure is required in order to force one of the teeth into its mating groove as the parts are telescoped together. If desired, both the radial and the circumferential dimensions of the groove are made smaller than those of the teeth, the amount being approximately .004 of an inch in the present instance. That is to say, the tips of the teeth project outwardly .004 of an inch beyond the roots of the grooves which are shown by the dotted lines in Fig. 4.

To connect the parts thus constructed, it is only necessary to force the end 15 of the non-metallic part into the aperture 13 while the teeth 14 and notches 17 are in register and the teeth are unsupported and, therefore, free to bend.

This is accomplished by supporting the parts in the proper relation and applying the axial pressure to the flange 12 at points disposed outwardly beyond the teeth. A tubular punch 18 of the size shown in Fig. 5 may be used for this purpose.

As the parts are thus forced together in telescoping relation, the edge portions of the teeth engage the defining edge portions of the groove which is smaller than the teeth. Therefore, in order for the teeth to enter the grooves, their edge portions at the sides and ends of the teeth must be bent backwardly as shown in Fig. 5. This action obtains owing to the thinness of the teeth and the fact that they are only slightly larger than the groove section coupled with the fact that the non-metallic material is sufficiently strong and rigid to resist breakage or cutting under the forces that must be applied in order to effect bending of the metal teeth.

The relative motion of the parts is continued until the flange 12 comes against the shoulder 16. At this time, the tube end will project through the aperture 13 with a press fit and the teeth will have been bent in two directions, one of which is shown in Fig. 5. Since the bend is reverse to the direction of entry of the end 15 and since the metal is somewhat harder than the plastic material, the edges of the teeth will bite into the plastic thereby locking the parts firmly against relative reverse movement.

If desired, the teeth on the metal part may be tapered and take the form of serrations 19 (Figs. 6 and 7) spaced around the interior of the aperture 13, being punched from the metal in the same way as the teeth 14. In such a case, the exterior of the male part 15 is preferably of cylindrical contour and slightly larger than the circle defined by the tips of the serrations or teeth. The assembly of the parts thus modified is effected in the same way as before, that is, by forcing the end 15 into the serrated hole while the flange 12 is supported by a punch 18 outwardly beyond the teeth 19.

This application is a continuation in part of my copending application, Serial No. 270,544, filed April 28, 1939.

I claim as my invention:

1. The combination of a metal part having a peripheral surface defined in part by annularly radially projecting teeth of generally rectangular shape, and a rigid non-metallic part telescoping with said metal part with a pressed fit and having annularly spaced notches complementing said teeth and receiving the latter but having at least one dimension slightly smaller than the corresponding dimension of the metal tooth, said teeth being bent and biting into the non-metallic part to lock the two parts together.

2. The combination of a metal part having a peripheral surface defined in part by a radially projecting tooth, and a rigid non-metallic part snugly telescoping with said metal part and having a notch complementing said tooth and receiving the latter but having at least one dimension slightly smaller than the corresponding dimension of the metal tooth, said tooth being bent and biting into the non-metallic part to lock the two parts together.

3. The combination of a metal part having a peripheral surface defined in part by a radially projecting tooth, and a rigid non-metallic part snugly telescoping with said metal part and having a notch complementing the tooth and receiving the latter but having two transverse dimensions slightly smaller than the dimensions of said tooth, said tooth being bent and biting into the non-metallic part to lock the parts against separation in one direction.

JAMES P. JORGENSEN.